US006360363B1

(12) United States Patent
Moser et al.

(10) Patent No.: US 6,360,363 B1
(45) Date of Patent: Mar. 19, 2002

(54) LIVE UPGRADE PROCESS FOR OBJECT-ORIENTED PROGRAMS

(75) Inventors: Louise E. Moser; Peter M. Melliar-Smith, both of Santa Barbara, CA (US)

(73) Assignee: Eternal Systems, Inc., Santa Barbara, CA (US)

( * ) Notice: Subject to any disclaimer, the term of this patent is extended or adjusted under 35 U.S.C. 154(b) by 0 days.

(21) Appl. No.: 09/223,699

(22) Filed: Dec. 30, 1998

Related U.S. Application Data

(60) Provisional application No. 60/070,102, filed on Dec. 31, 1997.

(51) Int. Cl.$^7$ ............................................... G06F 9/445
(52) U.S. Cl. ......................................... 717/11; 707/203
(58) Field of Search ...................... 717/1, 11; 707/203, 707/103

(56) References Cited

U.S. PATENT DOCUMENTS

| | | | |
|---|---|---|---|
| 5,555,418 A | | 9/1996 | Nilsson et al. |
| 5,644,771 A | * | 7/1997 | Endicott et al. ............ 395/712 |
| 5,708,809 A | | 1/1998 | Leimkoetter |
| 5,732,263 A | * | 3/1998 | Havens et al. .............. 395/614 |
| 5,752,042 A | | 5/1998 | Cole et al. |
| 5,764,992 A | | 6/1998 | Kullick et al. |
| 5,781,776 A | | 7/1998 | Johnston et al. |
| 5,878,432 A | * | 3/1999 | Misheski et al. ........... 707/103 |
| 5,909,581 A | * | 6/1999 | Park ........................... 395/712 |
| 5,974,454 A | * | 10/1999 | Apfel et al. ................ 709/221 |
| 6,006,034 A | * | 12/1999 | Heath et al. ................ 395/712 |
| 6,101,327 A | * | 8/2000 | Holte-Rost et al. ........... 717/11 |
| 6,128,771 A | * | 10/2000 | Tock et al. ..................... 717/1 |
| 6,289,510 B1 | * | 9/2001 | Nakajima ..................... 717/11 |

OTHER PUBLICATIONS

Hauptmann, Steffen and Wasel, Josef; "On–Line Maintenance With On–The–Fly Software Replacement," Third International Conference on Configurable Distributed Systems, pp. 70–80, May 6–8, 1996; Annapolis, Maryland.
Goudarzi, Kaveh Moazami and Kramer, Jeff; "Maintaining Node Consistency in the Face of Dynamic Change," Third International Conference on Configurable Distributed Systems, pp. 62–69, May 6–8, 1996; Annapolis, Maryland.
Bidan, Christophe, et al., "A Dynamic Reconfiguration Service For Corba," Fourth International Conference on Configurable Distributed Systems, pp. 35–42, May 4–6, 1998; Annapolis, Maryland.
Siewiorek, Daniel P. et al., "Reliable Computer Systems: Design And Evaluation", 2nd Edition, Burlington, MA: Digital Press, 1992, pp. 80–85; 191–193; 200–201.
Higaki e al. Group Communications for Upgrading Distributed Programs. IEEE. pp. 420–427, Jul. 1996.*

\* cited by examiner

*Primary Examiner*—Kakali Chaki
*Assistant Examiner*—Wei Zhen
(74) *Attorney, Agent, or Firm*—John P. O'Banion

(57) ABSTRACT

A process that assists a computer programmer to perform an upgrade to a computer program while that program continues to operate and provide service. The upgrade process includes three phases: (1) the preparation by a computer programmer of a new computer program P'" that is to replace an existing computer program P, (2) an offline preparation of the upgrade from P to P'" with the assistance of the computer programmer, and (3) an online, fully automatic, live upgrade from P to P'".

17 Claims, 13 Drawing Sheets

LIVE UPGRADE PROCESS FOR OBJECT-ORIENTED PROGRAMS

CROSS-REFERENCE TO RELATED APPLICATIONS

This application claims priority from U.S. provisional application Ser. No. 60/070,102 filed on Dec. 31, 1997.

STATEMENT REGARDING FEDERALLY SPONSORED RESEARCH OR DEVELOPMENT

This invention was made with Government support under Grant No. F30602-971-0284, awarded by the Air Force and Grant No. N000174-95-K-0083, awarded by the Navy. The Government has certain rights in this invention.

REFERENCE TO A MICROFICHE APPENDIX

Not Applicable

NOTICE OF MATERIAL SUBJECT TO COPYRIGHT PROTECTION

All of the material in this patent document is subject to copyright protection under the copyright laws of the United States and of other countries. The owner of the copyright and maskwork rights has no objection to the facsimile reproduction by anyone of the patent document or the patent disclosure, as it appears in the United States Patent and Trademark Office file or records, but otherwise reserves all copyright rights whatsoever.

BACKGROUND OF THE INVENTION

1. Field of the Invention

This invention pertains generally to computer systems that must operate continuously, and more particularly to a process for upgrading the software of a computer system while it continues to provide service.

2. Description of the Background Art

Many computer systems must operate continuously, twenty-four hours per day, 365 days per year, without interruption of service. Examples of such computer systems include air traffic control, telephone exchange, hospital intensive care and electric power distribution computer systems. Even brief interruptions of service of such computer systems could be catastrophic. Such computer systems typically consist of multiple computers where, if one computer becomes faulty, another computer can continue to provide service while the faulty computer is repaired.

All computer systems require periodic upgrading to replace obsolete hardware and software with new and improved hardware and software. The software may also need to be upgraded to correct defects that have been discovered in it. Upgrades to the hardware can be handled by the well-understood methods for handling faults in the hardware and repair of the hardware, such as those described by D. P. Sieworek and R. S. Swarz, Reliable Computer Systems: Design and Evaluation, 2nd edition, Burlington, Mass.: Digital Press, 1992.

On the other hand, upgrades to the software are more difficult. Two methods are used in the current practice. In the first method, all of the computers in the computer system are stopped for several minutes or hours, a computer program in all of the computers is replaced, and the computer system is then restarted. This method is unacceptable for many applications because the operation of the program is disrupted.

In the second method, one or more computers of the computer system are stopped for several minutes or hours and their copies of the computer program are upgraded, while the other computers continue to provide service. The computers, whose copies of the program have been upgraded, are then restarted and are directed to take over operation. The computers, whose copies of the program have not yet been upgraded, are then stopped and their copies of the program are upgraded. The disadvantage of this approach is that, when the computers take over operation, the information available to them may be obsolete, because the program continued to operate on the other computers. If the computers use obsolete information, they may produce incorrect results.

There are a number of known methods for upgrading critical computer systems. For example, U.S. Pat. No. 5,708,809 addresses upgrades to reflect changes in the hardware configuration. In that method, while the upgrade is invisible to the user, the upgrade is performed while the program is not actually executing. U.S. Pat. Nos. 5,752,042 and 5,764,992 address upgrading a computer program because a newer version of the program has become available. Here again, while the upgrade is invisible to the user, the upgrade is performed while the program is not actually executing. U.S. Pat. No. 5,781,776 addresses upgrading computer programs while they are executing. That patent describes making a modification to a computer program by placing a revised section of the program elsewhere in the memory of the computer and by modifying the current version of the program by inserting into the program a branch instruction that branches to the revised section of the program. That method, however, is very difficult and requires great skill to perform correctly. Furthermore, while minor modifications to a computer program are possible with that technique, substantial modifications are usually not feasible. In U.S. Pat. No. 5,555,418, an upgrade method is described in which a second copy of the computer program is introduced into the memory of the computer and mechanisms are provided to copy the data of the old program into the new program and also to divert arriving transactions from the old program to the new program. It is possible in that method to operate the old program and the new program concurrently, but they must use different sets of data and there must be no interaction between the two versions of the program.

As can be seen, therefore, there are many inadequacies associated with conventional methods for upgrading computer hardware and software in critical systems. In particular, there is a need for the upgrade mechanisms to be object-oriented rather than program-oriented, so that it is possible to replace just the few objects that have been modified instead of replacing the entire program. It is also desirable that the upgrade mechanism be able to achieve upgrades where the object or program interfaces have been modified, where the signatures of the methods (routines, procedures) have been modified, where the attributes (data) of the objects have been modified, or where it is necessary to interleave operations of the old and the new versions of the program while they operate on the same data. The present invention satisfies those needs, as well as others, and overcomes the deficiencies found in prior art upgrade methods.

BRIEF SUMMARY OF THE INVENTION

The present invention generally pertains to a process that assists a computer programmer to perform an upgrade to a computer program while that program continues to operate and provide service. By way of example, and not of limitation, an upgrade process according to the present invention is implemented in three phases: (1) the preparation by a computer programmer of a new computer program P''' that is to replace an existing computer program P, (2) an offline preparation of the upgrade from P to P''' with the assistance of the computer programmer, and (3) an online, fully automatic, live upgrade from P to P'''.

The present invention provides no specific assistance during phase (1), which involves the preparation of the new computer program.

During phase (2), however, which is the offline preparation phase, a mechanism of the invention prepares an intermediate program P' that contains an intermediate version of each of the program modules to be upgraded. The intermediate version of a program module contains both the old version used in P and the new version used in P'''. The intermediate version of the program module is used to ensure that the program can continue to operate without disruption of service while it is being upgraded. The mechanism inserts program code into the intermediate version that allows the module to switch from the old version to the new version, converting the state of the old version into the state of the new version as it does so.

During phase (3), which is the online live upgrade phase, a mechanism of the invention performs the upgrade from P to P''', fully automatically without disrupting the operation of the program. First, the mechanism performs the upgrade from P to P'. This upgrade is invisible and causes no disturbance to normal operation of the program. Next, the mechanism instructs the modules of P' to switch from their old versions to their new versions. Finally, the mechanism performs an invisible upgrade from P' to P''' again with no disturbance to normal operation of the program.

It is an object of the present invention to provide a mechanism that can upgrade a computer program without requiring that the normal operation of the computer program be suspended and without risking disruption during the upgrade.

It is another object of the present invention to provide a highly automated mechanism that can upgrade the computer program quickly to minimize the disturbance to the operation of the computer program.

It is a further object of the present invention to provide a mechanism that can upgrade the computer program without placing special constraints on the design, structure, interfaces, implementation or extent of modification of the upgraded program.

It is also an object of the present invention that, while the invention requires a computer programmer to participate in the preparation of the upgrade, such assistance should require only conventional programming skills and should require no special skill to perform the upgrade.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
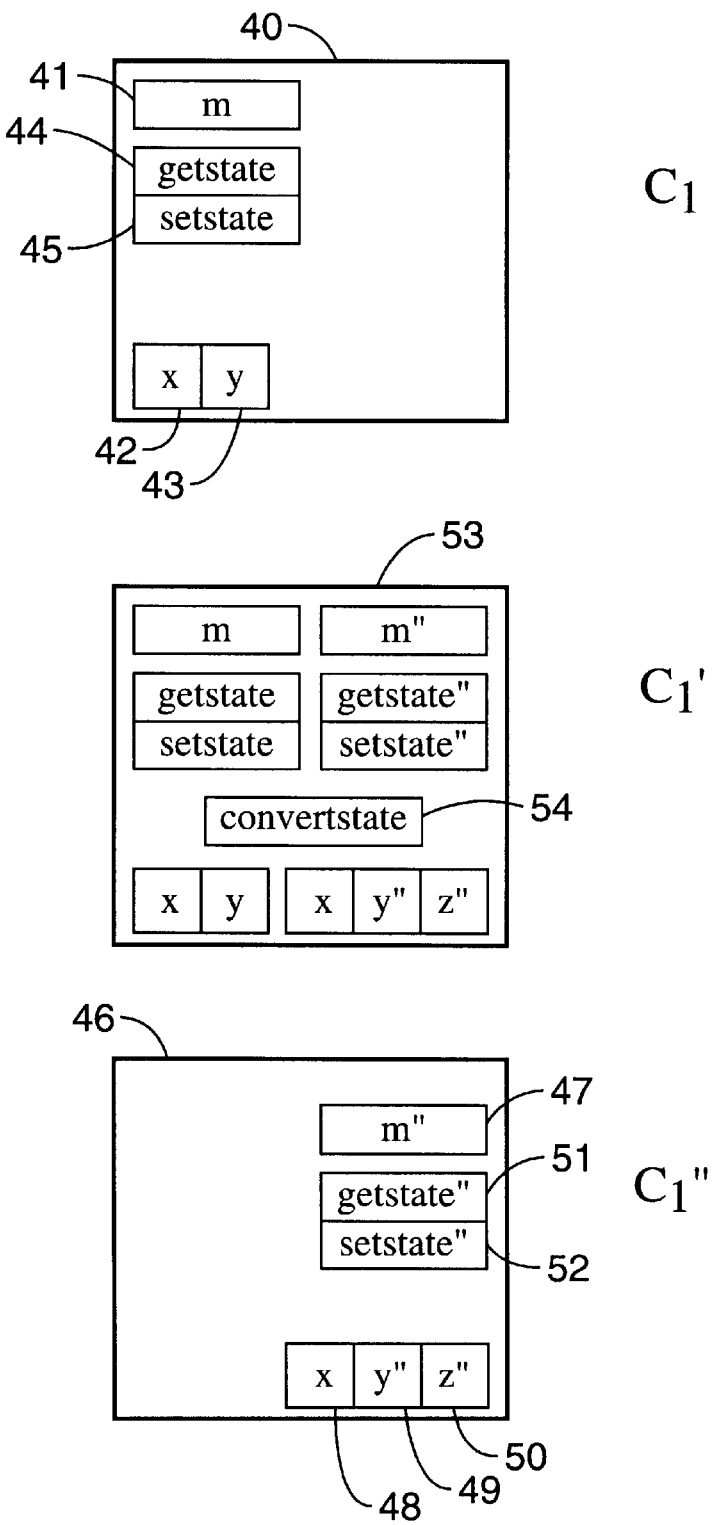
FIG. 1 is a flow diagram showing the upgrading of an object, from the old version $C_1$, at the top to the new version $C_1''$ at the bottom, with the intermediate version $C_1'$ in the center.

Referring more specifically to the drawings, for illustrative purposes the present invention is embodied in the process generally shown in FIG. 1 through FIG. 11. It will be appreciated that the invention may vary as to specific steps and their sequence without departing from the basic concepts as disclosed herein.

A. Definitions

The following detailed description of the live upgrade process of the present invention uses standard object-oriented terminology as is used in C++, Java and other object-oriented programming languages, as well as in distributed object architectures such as CORBA (Common Object Request Broker Architecture) and ActiveX/DCOM (Distributed Component Object Model). In particular, the following definitions are used:

A "class" is a collection of objects that share a common structure and a common behavior. The structure of a class is determined by a set of attributes, and the behavior is given by a set of methods associated with the class. A class definition describes all of the attributes of member objects of that class, as well as the methods that implement the behavior of member objects.

A "class hierarchy" is an ordering of classes, where one class (a subclass or derived class) inherits the attributes and methods of another class (a superclass). A subclass usually extends or modifies the attributes and methods of a superclass.

An "object" is an instance of a class that is created during the execution of the program. It is uniquely identified by its name and defines a state which is represented by the values of its attributes at a particular time.

An "instance" of a class is the same as an object. An instance is a member of a class, exists, and has identity.

A "method" is a procedure or routine that is part of the declaration of a class. Methods are used to implement object behavior, and define the operations or services performed by an object.

The "signature" of a method is the list of parameters of the method with their types, together with the exceptions of the method.

An "attribute" of a class is a data structure of that class.

A "message" is sent to an object to invoke one of its methods. A message contains the name of the method and the parameters of the method.

The "state of an object" or an "object's state" is the values of the attributes of the object. An object's state may change over time. A change in the state of an object is a consequence of messages sent to the object that invoke methods of the object.

A "replica" of an object is a copy of the object that has the same state as the original object and that is typically hosted on a different computer.

An object $C_1$ of a class C is "active" if one of C's methods has been invoked and has not yet completed and generated the response.

An object $C_1$ is "inactive" if it is ready to accept and process an invocation of its methods by another object $B_1$. If C's method has invoked, synchronously, a method of another class D and C is blocked waiting for a response, the object C, is still active. Asynchronous invocations do not block an object in the active state.

B. Introduction

The present invention exploits mechanisms for fault tolerance previously developed by the inventors hereof for creating objects that have multiple replicas (L. E. Moser, P. M. Melliar-Smith and P. Narasimhan, "Consistent object replication in the Eternal system," Theory and Practice of Object Systems, Vol. 4, No. 2, January 1998, pp. 81–92) and for maintaining the consistency of the object replicas using an atomic broadcast (reliable totally ordered multicast) protocol (L. E. Moser, P. M. Melliar-Smith, D. A. Agarwal, R. K. Budhia and C. A. Lingley-Papadopoulos, "Totem: A fault-tolerant multicast group communication system," Communications of the ACM, vol. 39, no. 4, April 1996, pp. 54–63). Both publications are incorporated herein by reference.

The mechanisms described in the foregoing two publications allow the system to maintain multiple replicas of an object and to ensure that the states of all of the replicas of an object remain consistent, that is, that they all have the same state. These mechanisms exploit reliable totally ordered multicasts to ensure that all of the replicas of an object receive the same messages in the same order. Consequently, they all execute the same method invocations in the same order, which maintains the consistency of the states of the object replicas.

The mechanisms for object replication can create a new replica of an object with the same state as that of an existing replica of the object. They can also copy the internal state from one replica of an object to another replica of the same object. These mechanisms involve two additional methods provided for each object. The "getstate" method, invoked on an object, returns a serialized structure that encodes the current state of the object. The "setstate" method, invoked on an object with a parameter produced by getstate, sets the state of the object. The getstate and setstate methods can be programmed by the computer programmer. Alternatively, they can be generated automatically by a preprocessor that is applied to the source code of a class before it is compiled. The mechanisms required to generate these two methods automatically are described in the prior art (D. H. Craft, "A study of pickling," Journal of Object-Oriented Programming, January 1993, pp. 54–66). That publication is also incorporated herein by reference.

The state of an object is transferred in a message that is communicated by the reliable totally ordered multicast protocol, again ensuring that all of the replicas determine the same relationship between the state transfer and the operations performed on that state, a concept known as "virtual synchrony".

C. Detailed Description of the Invention

With the foregoing as background, the present invention comprises a method for performing live upgrades to object-oriented programs. No down time of the computer system is required. The upgrade of a large program is performed in a sequence of steps, each step being completed and demonstrated to operate satisfactorily before the next step is undertaken. One such step is described below for an existing object-oriented program P that must be upgraded. It will be appreciated that the method of the invention can be extended to upgrading any number of programs in a computer system.

Each step of the upgrade process comprises three phases: (1) the preparation by a computer programmer of an object-oriented program P" that is to replace the existing program P, (2) an offline preparation of the upgrade from P to P" by the Preparer mechanism of this invention with the assistance of the computer programmer, and (3) an online, fully automatic, live upgrade from P to P" by the Upgrader mechanism of this invention. The programs P, P' and P" are all assumed to be written in the same object-oriented programming language.

During phase (1), the computer programmer writes the object-oriented program P" that is to replace the existing program P. The present invention provides no specific assistance to the programmer during phase (1). To obtain P" from P, the programmer can make syntactic and semantic changes to the classes of P including changes to both the interfaces and the implementation of those classes, and changes to both the methods and attributes of those classes.

During phase (2), the offline preparation phase, the "Preparer" mechanisms of the invention prepare a program P' that contains intermediate versions of the classes to be upgraded. These intermediate versions are used to ensure that the computer program can continue to operate without disruption while it is being upgraded.

During phase (3), the online upgrade phase, the "Upgrader" mechanisms of the invention perform the upgrade from P to P", fully automatically without disrupting the operation of the computer program.

The detailed description of the live upgrade process given below considers first, in Section 1, the mechanisms that the Upgrader uses in phase (3) to upgrade a single object of a class with no changes to the signatures of the methods of the class. Then, in Section 4, it addresses the mechanisms that the Upgrader uses in phase (3) to upgrade the objects of several classes, each with several object instances and with changes to the signatures of the methods of the classes as described in Section 4. Finally, in Section 6, the description considers the mechanisms that the Preparer uses in phase (2) to prepare the intermediate versions of the classes with the assistance of the programmer.

1. Section 1

Referring first to FIG. 1, the three stages of the upgrading of an object of an existing class C of the computer program P are shown. FIG. 1, at the top, shows an object $C_1$ of class C at step 40. Shown in this object is the method $C_1$.m 41 and the attributes $C_1$.x 42 and $C_1$.y 43. Also shown in the object are the methods $C_1$.getstate 44 and $C_1$.setstate 45. FIG. 1, at the bottom, shows the object $C_1$"of the new class C" at step 46, programmed by the computer programmer as a replacement for class C.

This upgrade requires no change to the signatures of the methods of class C. Such a change would require modifications to additional classes, namely those that invoke the methods of class C. Rather, the upgrade requires a change in the implementation of the method $C_1.m$ to obtain the method $C_1''.m''$ 47. Furthermore, the upgrade requires a change from the attributes $C_1.x$ and $C_1.y$ to the attributes $C_1''.x$ 48, $C_1''y''$49 and $C_1''.z''$50. Thus, $C_1.x$ 48 is unchanged, $C_1.y$ is changed to $C_1''.y''$49, and $C_1''.z''$50 is a new attribute. The new object $C_1''$ also has the $C_1''.getstate''$51 and $C_1''.setstate''$52 methods.

FIG. 1, in the center, shows the intermediate object $C_1'$ of class C' at step 53 which contains the old and new methods, the old and new attributes, the old and new state transfer methods, and also the convertstate method 54. The $C_1'.convertstate$ method converts the state of the old replica to the state of the new replica, deriving values from the old attributes and assigning them to the new attributes. The $C_1'.convertstate$ method also determines whether the old method m or the new method m'' should be invoked. Initially, all invocations of the method are directed to the old method m. When the convertstate method is invoked, it sets an internal flag, the old new flag, which diverts all subsequent invocations of the method to the new method m''.

The computer programmer constructs the classes C and C'' in advance. The process by which the Preparer constructs the class C', including the convertstate method, from the classes C and C'' is described in Section 6, whereas the process by which the Upgrader upgrades an object $C_1$ of class C to obtain an object $C_1''$ of class C'' is described in Section 2.

Figure 2A:
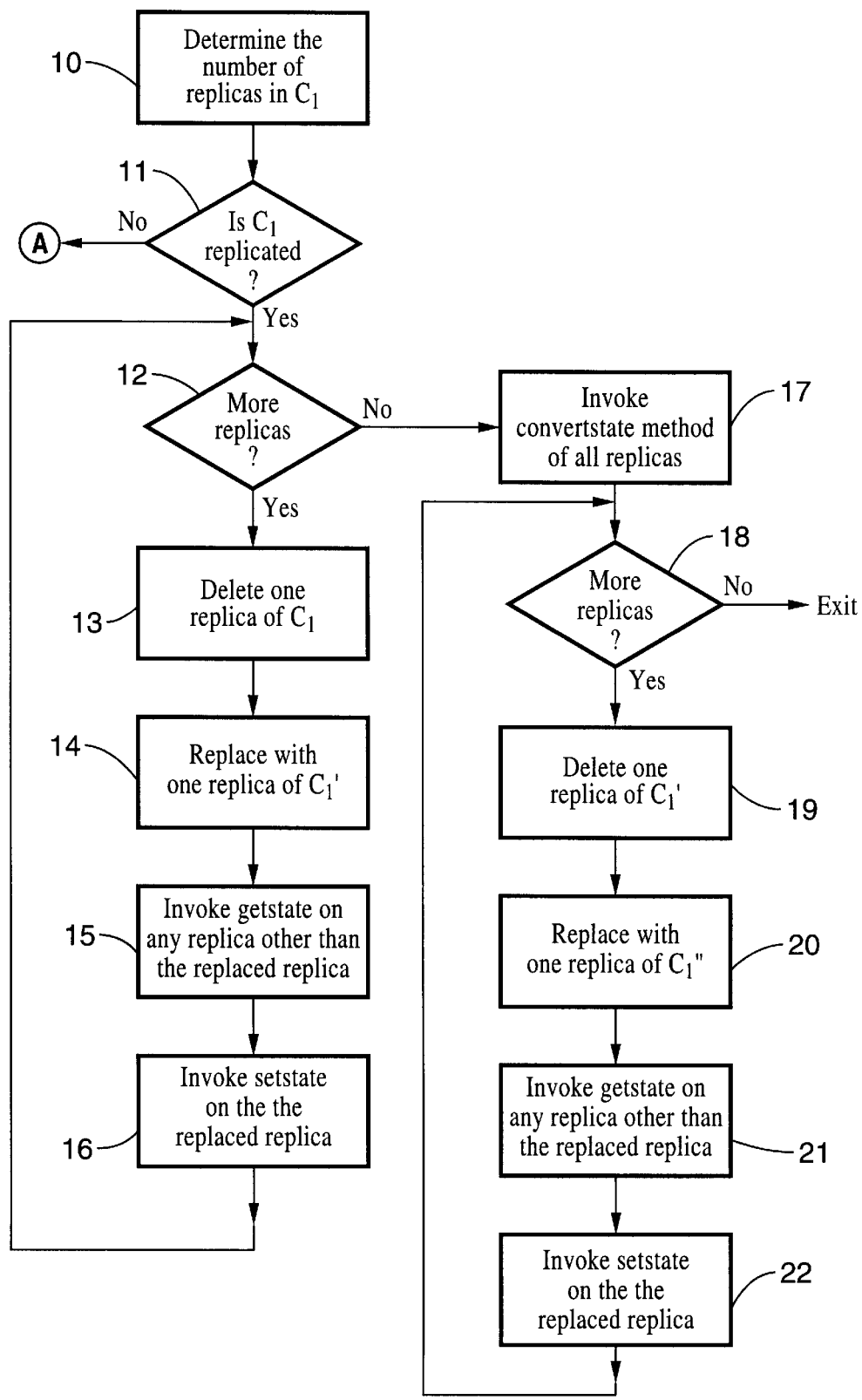
FIG. 2A and FIG. 2B is a flow chart of an algorithm for upgrading an object, with FIG. 2A showing the steps for upgrading a replicated object and FIG. 2B showing the steps for upgrading an unreplicated object.
Figure 3:
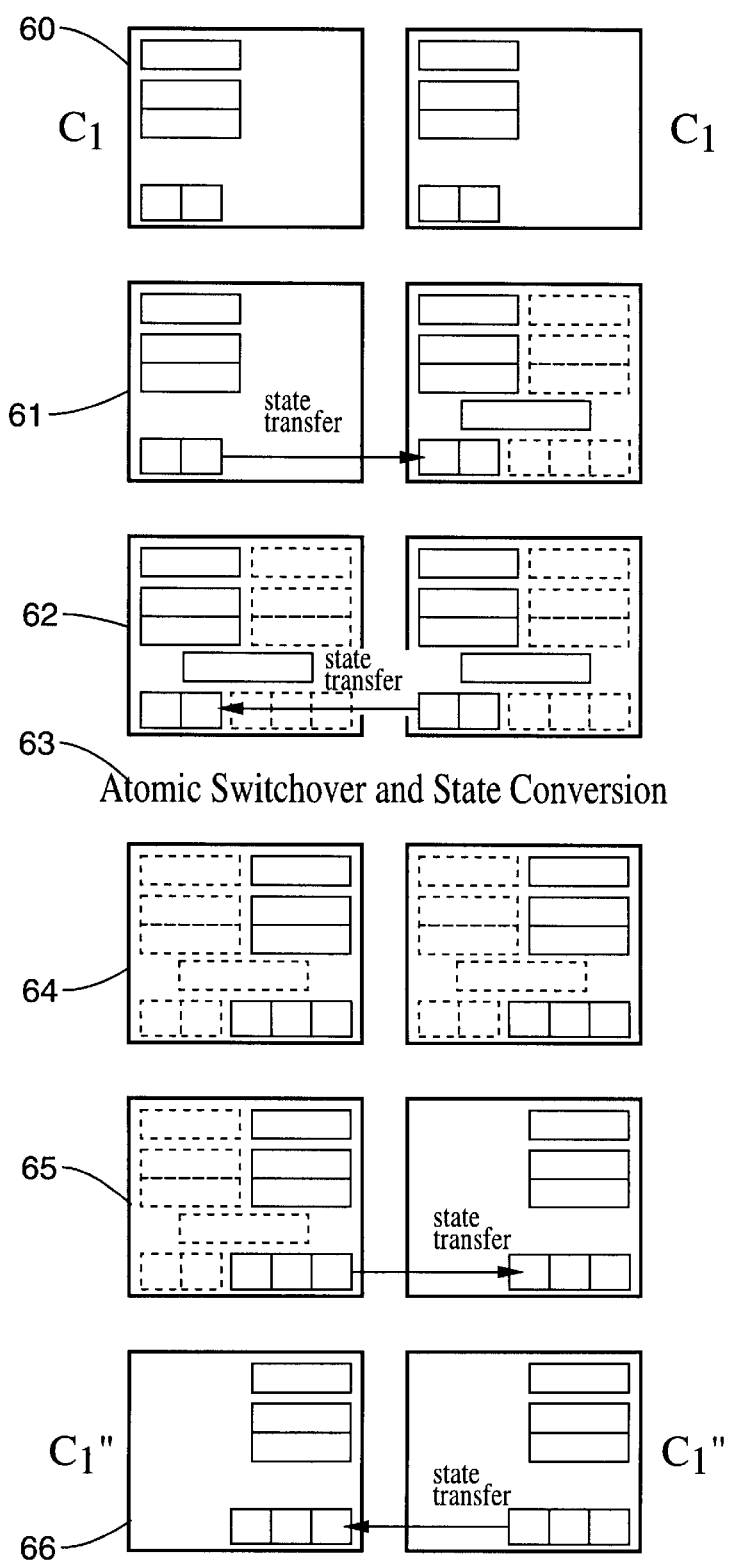
FIG. 3 is a flow diagram showing the upgrading of a replicated object with two replicas.

FIG. 2A shows the preferred algorithm by which the Upgrader performs the upgrade from the object $C_1$ to the object $C_1''$, and FIG. 3 shows the intermediate points in the upgrade, assuming that there are two replicas of the object $C_1$. The generalization to more replicas is straightforward. A modification of the algorithm for the case of a single replica of the object $C_1$ is described in Section 3.

2. Section 2

As shown in FIG. 2A, the Upgrader determines the number of replicas of the object $C_1$ at step 10, and checks whether there is more than one replica at step 11. Within a loop for each of the replicas of $C_1$, the Upgrader deletes one of the replicas of $C_1$ at step 13 and replaces it with a replica of $C_1'$ at step 14. The other replica of $C_1$ continues to provide service. The Upgrader transfers the state of the other replica to the replica of $C_1'$ using the getstate and setstate methods at steps 15 and 16, respectively. Referring also to FIG. 3, wherein the original object $C_1$ is shown at step 60, the replica of $C_1'$ then starts to operate using the old method $C_1'.m$ and the old attributes $C_1'.x$ and $C_1'.y$, as diagrammatically shown at step 61. The new method $C_1'.m''$ and the new attributes $C_1'.x''$ and $C_1'.y''$ remain disabled, indicated in FIG. 3 by dashed lines.

The second replica of $C_1$ is replaced similarly by an intermediate version, as shown in FIG. 3 at step 62. At this moment, both replicas of $C_1'$ are equipped with the old and the new methods, and the old and the new attributes, but both replicas are using only the old methods and the old attributes.

The Upgrader now determines that there are no more replicas at step 12 in FIG. 2A and invokes the $C_1'.convertstate$ method at step 17 to perform an "atomic switchover" of all of the replicas of $C_1'$(step 63 in FIG. 3). Here the term "switchover" is used to designate the use of the convertstate method to switch from the use of the old method $C_1'.m$ to the new method $C_1'.m''$. The term "atomic" is used to designate that all replicas perform this switchover at the same logical time in their sequence of method invocations and as a single indivisible operation. The Upgrader exploits the message ordering facilities of the atomic broadcast protocol to ensure that the $C_1'.convertstate$ method is invoked on both replicas at the same logical point in the sequence of operations. If one replica performs the $C_1'.convertstate$ method before some invocation of $C_1.m$ and thus uses method $C_1'.m$, while another replica performs the $C_1'.convertstate$ method after some invocation of $C_1.m$ and thus uses the method $C_1'.m''$, the two replicas might produce different results and the operation of the computer program might be incorrect. By ensuring that the method invocations and also the invocation of $C_1'.convertstate$ are performed in the same sequence at every replica, the invention ensures an atomic switchover and, thus, the correct operation of the computer program.

The $C_1'.convertstate$ method assigns values to the new attributes $C_1'.x''$, $C_1'.y''$ and $C_1'.z''$ that are derived from the values of the old attributes $C_1'.x$ and $C_1'.y$. It also disables the old method $C_1'.m$ and enables the new method $C_1'.m''$.

In FIG. 3 at step 64 both replicas are equipped with both old and new methods, and both old and new attributes, but are now using the new methods and the new attributes, as indicated by the solid lines. In the remainder of the upgrade at steps 65 and 66 in FIG. 3, the two replicas of $C_1'$ are replaced with replicas of $C_1''$ containing only the new methods and the new attributes, thus completing the upgrade at steps 18 through 22 shown in FIG. 2A.

3. Section 3

In the case of an unreplicated object $C_1$ (i.e., a single replica of $C_1$), a simple algorithm would first introduce a second replica of $C_1$, then invoke the algorithm described in Section 2 and shown in FIG. 2A, and then delete the second replica of $C_1$. For an unreplicated object, such an algorithm may be more costly in its use of memory, computation and communication than is necessary.

Figure 2B:
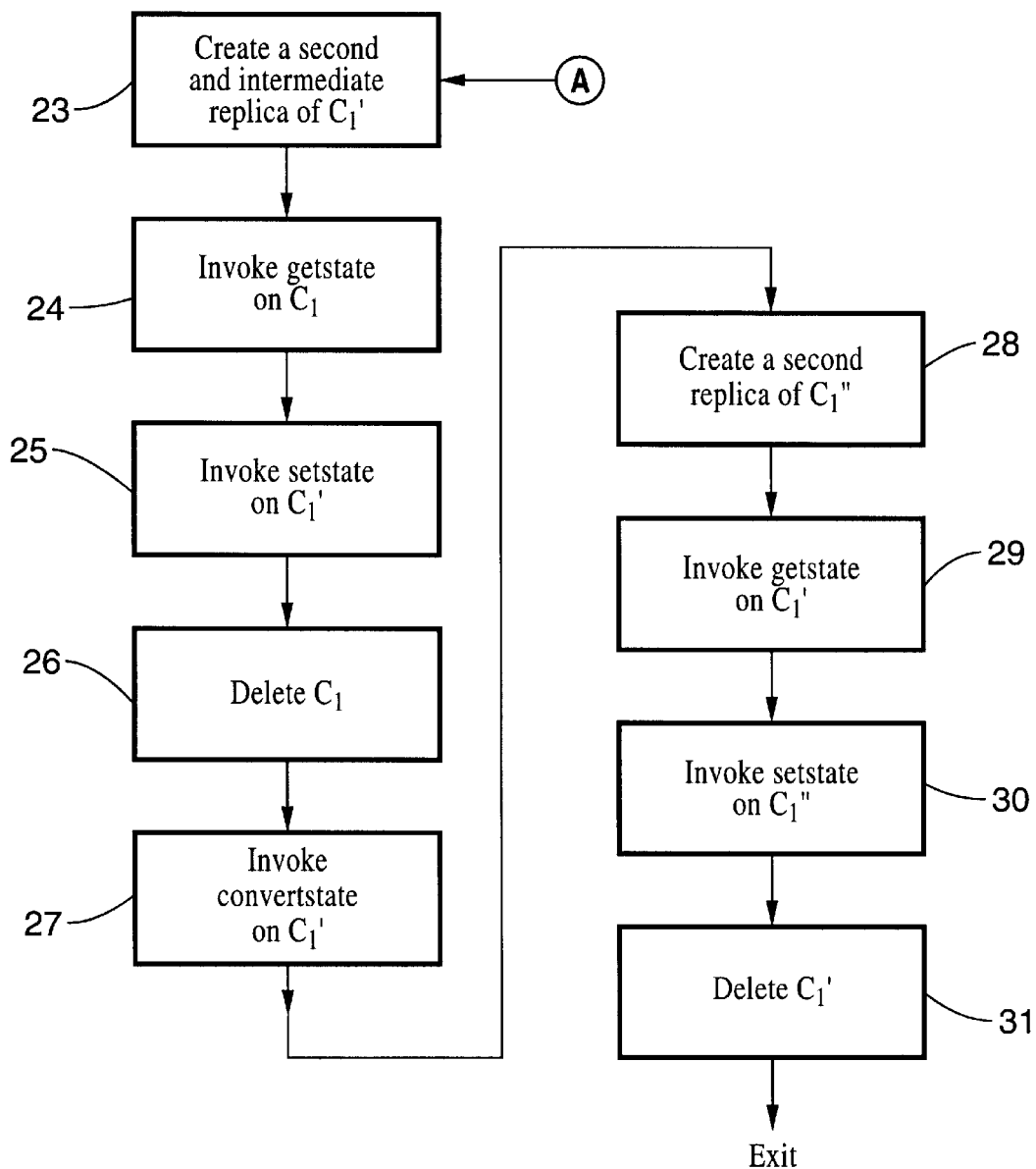
Figure 4:
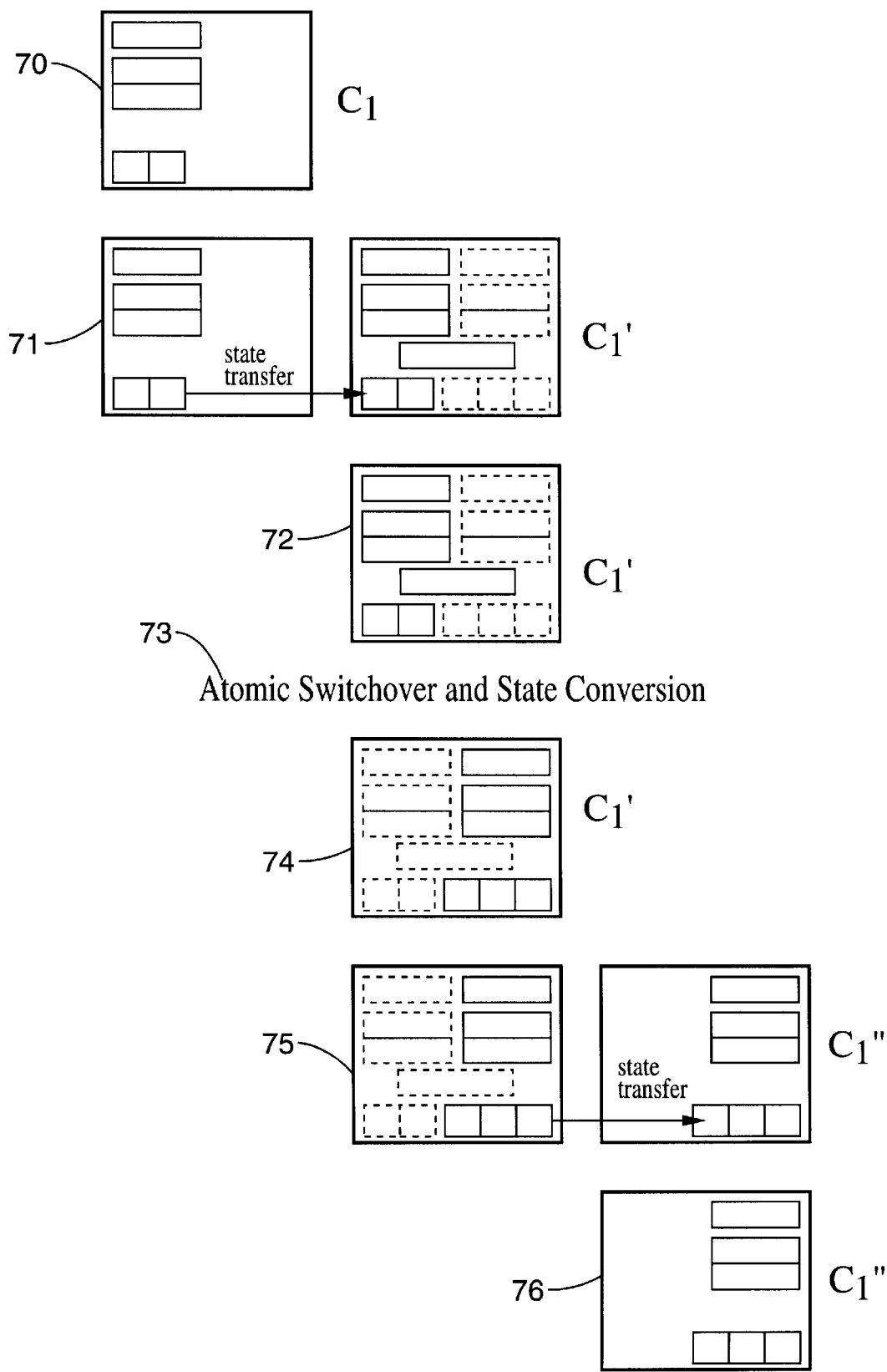
FIG. 4 is a flow diagram showing the upgrading of an unreplicated object.

FIG. 2B shows the less expensive algorithm by which the Upgrader performs the upgrade from the unreplicated object $C_1$ to the new version of that object $C_1''$, and FIG. 4 shows the intermediate points in the upgrade. Having determined that there is one replica of $C_1$ at step 11, the Upgrader creates a second and intermediate replica $C_1'$ containing both old and new methods and old and new attributes at step 23, as shown in FIG. 4 at step 71. The state of $C_1$ is transferred to $C_1'$, using the getstate and setstate methods at steps 24 and 25, respectively. Once $C_1'$ has the current state and is operating, $C_1$ is deleted at step 26, as shown in FIG. 4 at step 72.

The atomic switchover and state conversion is performed using only $C_1'$ by invoking the convertstate method at step 27, as shown in FIG. 4 at step 73. Another replica $C_1''$ containing only the new methods and the new attributes is then created at step 28 as shown in FIG. 4 at step 75. The Upgrader then transfers the state from $C_1'$ to $C_1''$, using the getstate and setstate methods at steps 29 and 30, respectively. The Upgrader then deletes the replica $C_1'$ at step 31 and a final upgraded but unreplicated object $C_1''$ remains, as shown in FIG. 4 at step 76.

4. Section 4

Because of the class inheritance structure of the object-oriented program, it is possible that a modification to a class may result in the modification of several other classes. Provided that the signatures of the methods of those classes are unchanged, both syntactically and semantically, the upgrades can be regarded as independent and each object of those classes can be upgraded as described in Section 2.

Similarly, if there are multiple objects of a single class, each object of the class can be upgraded as described in Section 2, provided that the signatures of the methods of the class are unchanged, both syntactically and semantically. No special synchronization between the upgrades is required.

Figure 5:
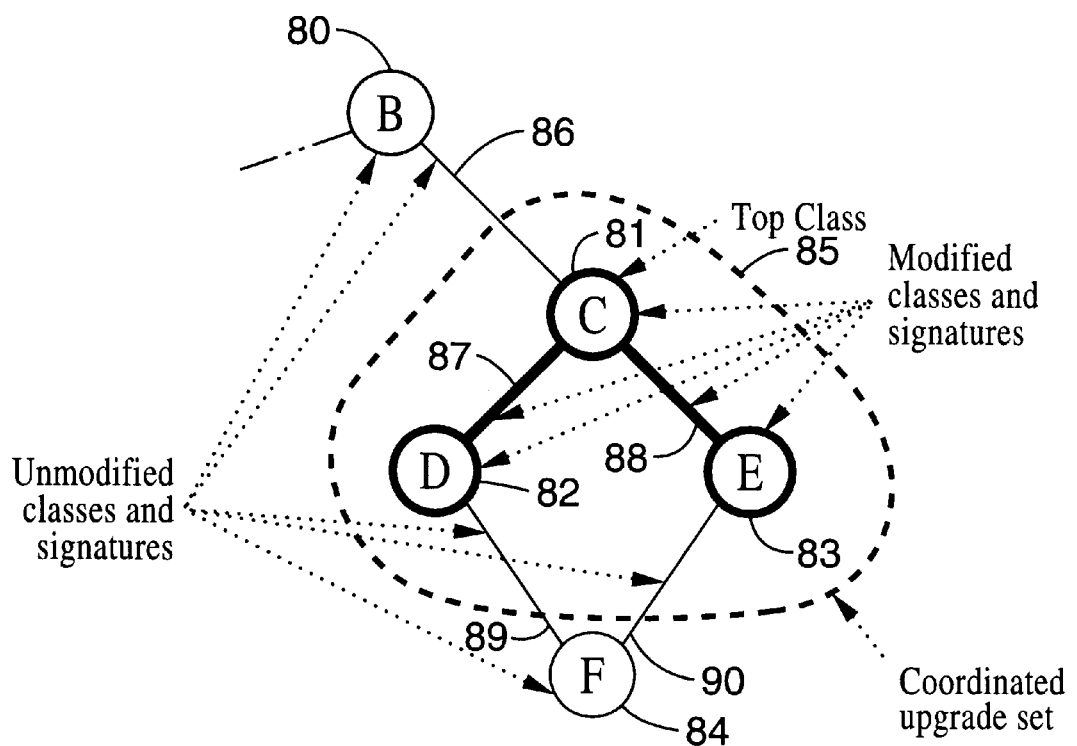
FIG. 5 is a diagram showing a coordinated upgrade set containing three classes, C, D and E.

When the signature of a method of a class is changed, the situation is more complex, because the change affects both the objects of that class and the objects of other classes that invoke the method. The objects of several classes may need to be considered for upgrade simultaneously. FIG. 5 depicts a coordinated upgrade set 85 containing classes C, D and E.

FIG. 5 shows an example in which an object of class B 80 invokes methods of objects of class C 81, objects of class C invoke methods of objects of classes D 82 and E 83, and objects of classes D and E invoke methods of objects of class F 84. The signature of the method of class D has been modified 87, and the signature of the method of class E has been modified 88. The signatures 86, 89, 90 of all of the other methods have not been modified, either syntactically or semantically.

Figure 7:
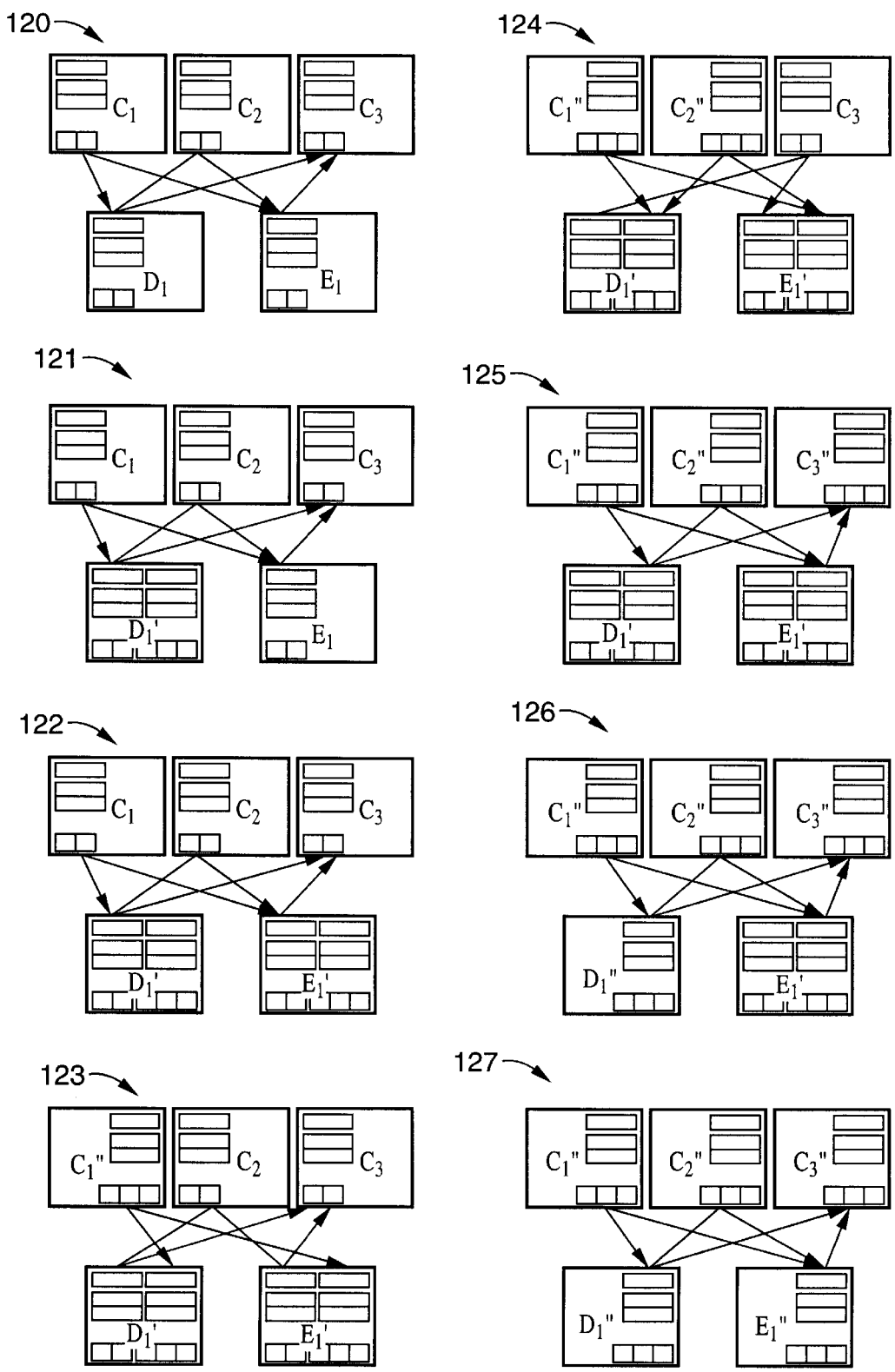
FIG. 7 is a flow diagram showing the upgrading of the objects of classes in a coordinated upgrade set containing three classes, C, D and E, with three objects in class C and one object in each of classes D and E.

FIG. 7 illustrates the operation of the Upgrader, in this case with three objects $C_1$, $C_2$ and $C_3$ of class C, and one object of each of classes D and E. The number of objects of each class is not critical but the algorithm is described under the assumption that, in general, there will be more than one object of each class.

The algorithm uses a graph, well-understood in the art, called the "class inheritance graph" whose nodes represent classes and whose edges represent the inheritance of declarations, and another graph, called the "method invocation graph", also well-understood in the art, whose nodes represent classes and whose edges represent method invocations. For simplicity of exposition, the method invocation graph is assumed to be acyclic. Cycles in the method invocation graph are not permitted in CORBA or Java.

The Preparer constructs a set of classes, called the "coordinated upgrade set", such that an object of each class in the set invokes, or is invoked by, an object of another class in the set using a method whose signature has been modified. The classes in such a coordinated upgrade set must be considered together, whereas the classes in different coordinated upgrade sets can be considered independently and concurrently. As indicated above, FIG. 5 shows a coordinated upgrade set 85 containing classes C, D and E.

A class in a coordinated upgrade set, the objects of which are not invoked by objects of other classes in the set, is referred to as a "top class". In FIG. 5, C 81 is a top class. Some coordinated upgrade sets may contain only a single class, which is necessarily a top class. Other coordinated upgrade sets may contain several classes and even several top classes. The handling of a top class is simpler than the handling of other classes in the set.

The difficulty of upgrading the objects of the classes in a coordinated upgrade set arises in part from the necessity to upgrade an object only when it is inactive. No safe method is known for upgrading objects that are active. In the example shown in FIG. 5, it is possible to upgrade the objects $C_1$, $C_2$, $C_3$, $D_1$ and $E_1$ together when all of them are inactive. During normal operation, there may be different points in time when each of $C_1$, $C_2$ and $C_3$ is inactive. However, there may never be a point in time when all three of these objects are inactive. If the mechanism were to force such a point in time, it might have to prevent invocation of any of the methods of one or more objects, possibly interfering with the normal operation of the program for a significant period of time.

If, instead, the Upgrader upgrades the objects $C_1$, $C_2$ and $C_3$ at different points in time, upgrading each object when it is individually inactive, it is possible that $C_1$ has been upgraded and is invoking the methods of $D_1$ and $E_1$ using the new method signatures, while $C_2$ has not yet been upgraded and is still invoking the methods of $D_1$ and $E_1$ using the old method signatures. The Preparer mechanisms of the invention construct intermediate versions of the objects of the classes D and E that support both the old method signatures and the new method signatures concurrently. The means by which those intermediate versions are constructed, by interaction with the programmer during the preparation for the upgrade, is described in Section 6.

5. Section 5

Figure 6A:
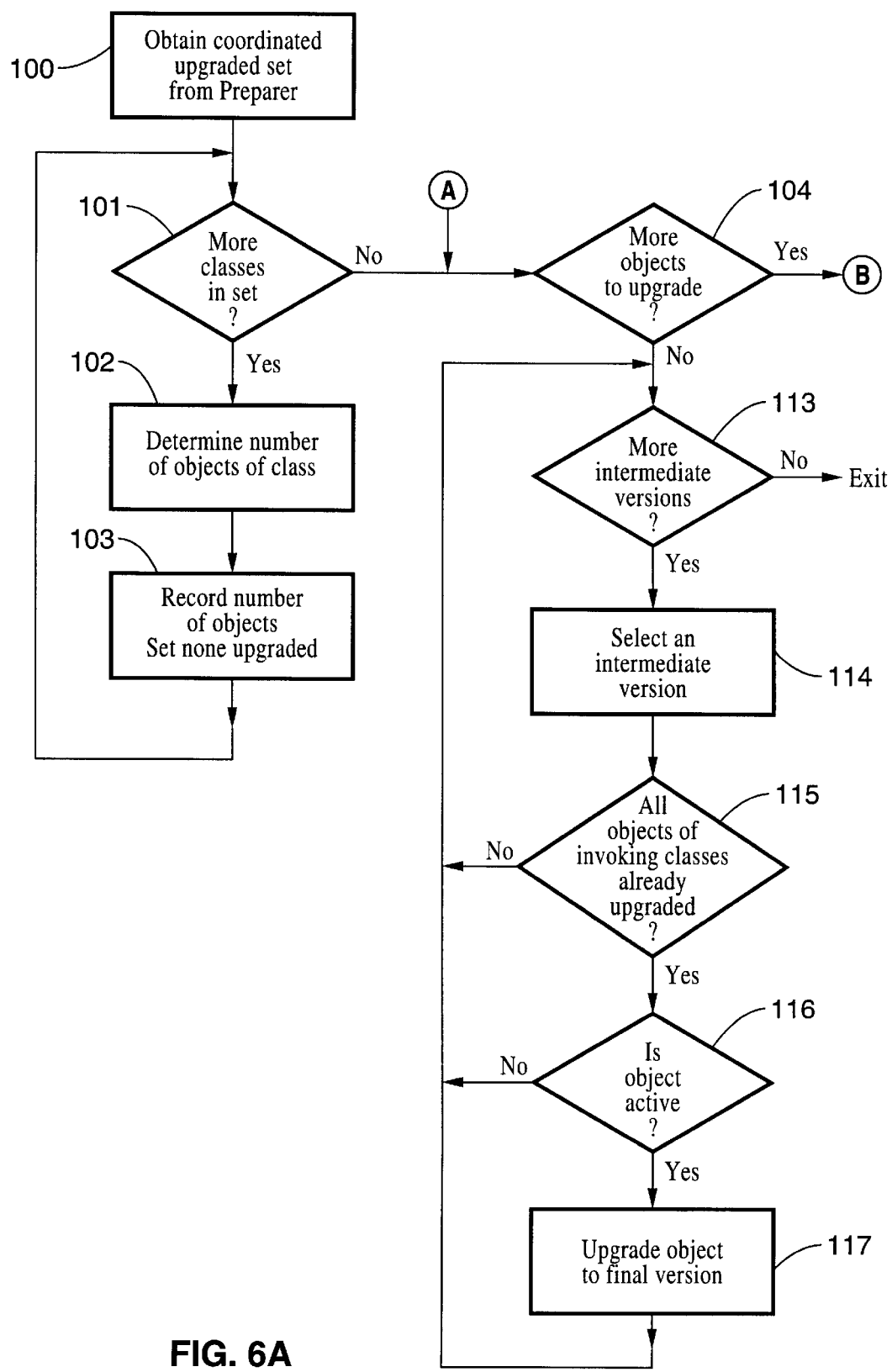
FIG. 6A and FIG. 6B is a flow chart of an algorithm for upgrading the objects of classes in a coordinated upgrade set.
Figure 6B:
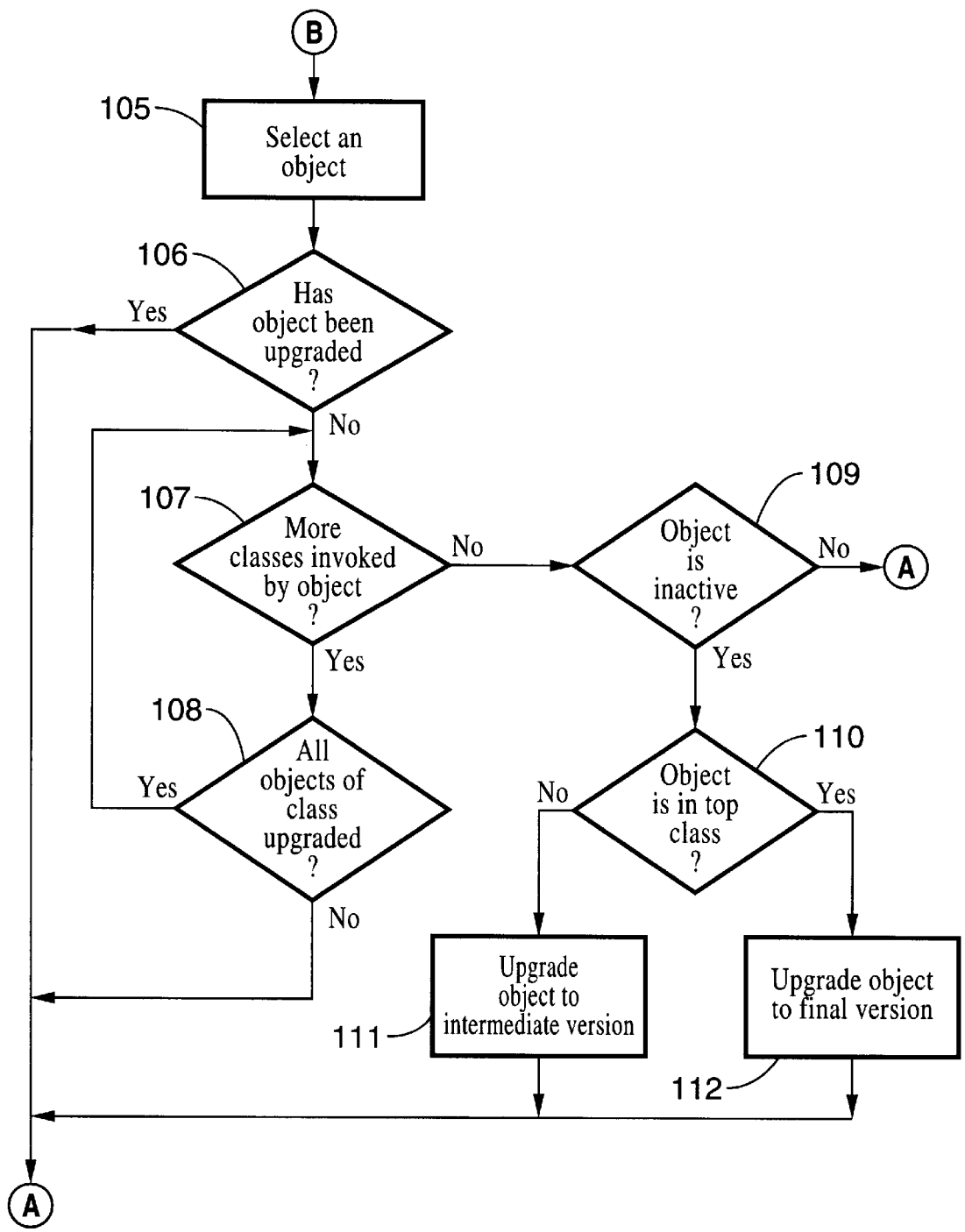

The algorithm that the Upgrader uses to upgrade a coordinated upgrade set is shown in FIG. 6A and FIG. 6B, and the intermediate points in the upgrading of the objects of classes C, D and E are shown in FIG. 7. The mechanism works for replicated objects, but FIG. 7 depicts only unreplicated objects.

The Upgrader obtains from the Preparer the classes within the coordinated upgrade set together with the method invocation graph for those classes, as shown in FIG. 6A at step 100. For each class in the set, the algorithm first determines at step 102 and records at step 103 the number of objects of that class. It also records that none of these objects has been upgraded.

Until all objects have been upgraded, as indicated by a test for inactive objects at step 109, at step 105 the algorithm selects for upgrading an object of a class in the coordinated upgrade set, provided that (1) all objects of classes (step 107) in the coordinated upgrade set that it invokes have been upgraded to support both the old and the new methods (step 108), and (2) it is inactive (step 109). If the object is an instance of a top class (step 110), the Upgrader upgrades the object to its final version at step 112. Otherwise, the Upgrader upgrades the object to an intermediate version at step 111. In both cases, this replacement is performed by the mechanisms described in Section 2 and Section 3, and shown in FIG. 2A and FIG. 2B, for the upgrading of a single object.

Once all objects of all classes in the coordinated upgrade set have been upgraded (step 109), the algorithm reconsiders every object at step 114. If the object has not yet been upgraded to its final version (step 115) and if the object is inactive (step 116), then the object is upgraded to its final version at step 117. This replacement is performed by the mechanisms described in Section 2 and Section 3, and shown in FIG. 2A and FIG. 2B, for the upgrading of a single object.

As shown in FIG. 7, the first step involves replacing the object $D_1$ by an object $D_1'$ that supports both the old methods and the new methods (step 121). Next, the object $E_1$ is replaced similarly by $E_1'$ at step 122. At this stage, the methods of both $D_1$ and $E_1$ can be invoked using either the old or the new signatures and, thus, the objects $C_1$, $C_2$ and $C_3$ can be replaced by $C_1''$, $C_2''$ and $C_3''$, respectively, in any order at steps 123,124 and 125. Because C is a top class, the signatures by which the objects of class B invoke methods of the objects of class C are not changed; thus, there is no need to construct intermediate versions of the objects of class C. Once all of the objects of class C have been replaced at step 125, $D_1'$ is replaced by $D_1''$ at step 126 and then $E_1'$ is replaced by $E_1''$ at step 127 to complete the upgrade. Each of the replacements of $C_1$, $C_2$ and $C_3$ and the replacements of $D_1$ and $E_1$ are performed using the mechanisms described in Section 2 and Section 3, and shown in FIG. 2A and FIG. 2B, for the upgrading of a single object.

6. Section 6

Figure 8:
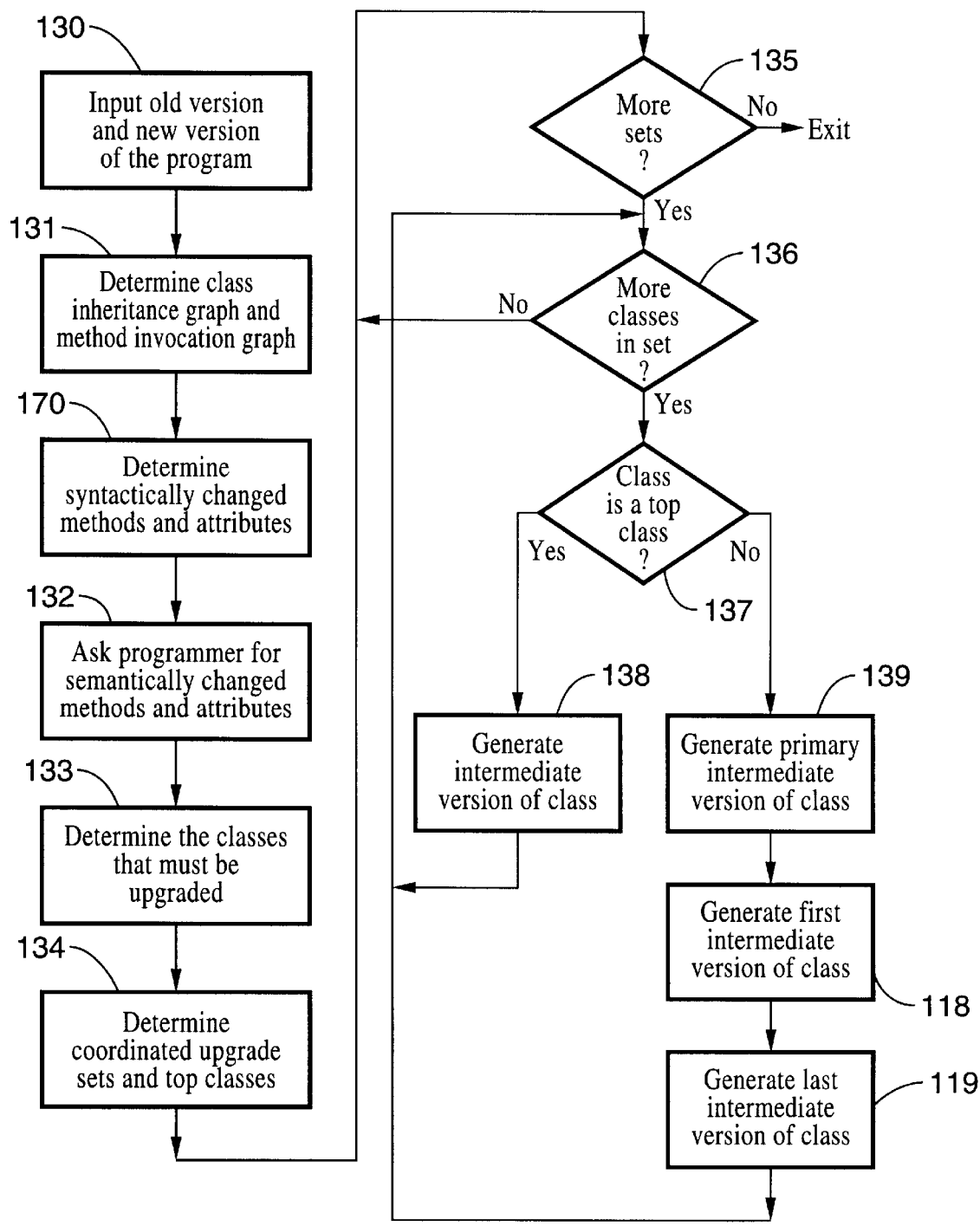
FIG. 8 is a flow chart of an algorithm used by the Preparer for generating the code of the intermediate version of a class.

The Preparer is employed before the actual upgrade, offline, with the assistance of the computer programmer. As shown in FIG. 8, the starting point for this preparation is two versions of the program, the old version and the new version (step 130). The Preparer determines the class inheritance graphs and the method invocation graphs for the two versions at step 131. It then compares the two versions of the program to determine which methods and attributes have changed syntactically (step 170). It also interrogates the programmer to determine whether any of the declarations of the methods or attributes of any of the classes have changed semantically but not syntactically at step 132. Recognizing semantic changes in the source code is beyond the capabilities of an automated tool without human assistance.

At this point, the Preparer identifies the classes that have been changed and must be upgraded at step 133, and also determines the coordinated upgrade sets and their top classes at step 134. For each of the coordinated upgrade sets (step 135) and for each class in such a set (step 136), the Preparer determines whether the class is a top class (step 137). If the class is a top class, the Preparer generates an intermediate class (step 138). Otherwise, the Preparer generates a primary intermediate version of a class (step 139) and also the first intermediate version (step 118) and the last intermediate version (step 119). The objects of the classes in each of these coordinated upgrade sets are upgraded in the order determined by the algorithm for the Upgrader, described in Section 5 and shown in FIG. 6A and FIG. 6B.

7. Section 7

Figure 9:
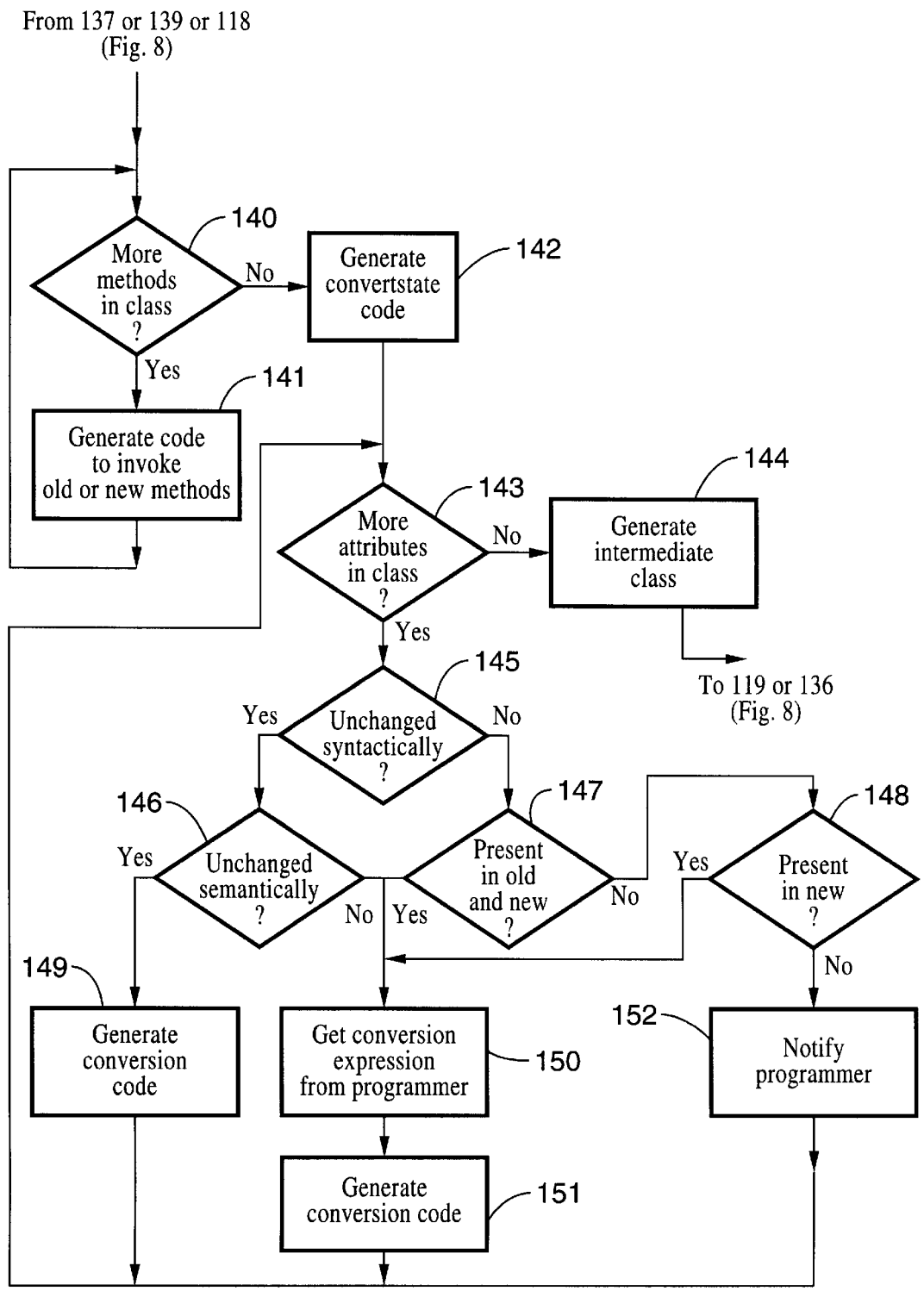
FIG. 9 is a flow chart of an algorithm used by the Preparer for generating the code of the intermediate version of a top class, or the first or last intermediate versions of a class.
Figure 11:
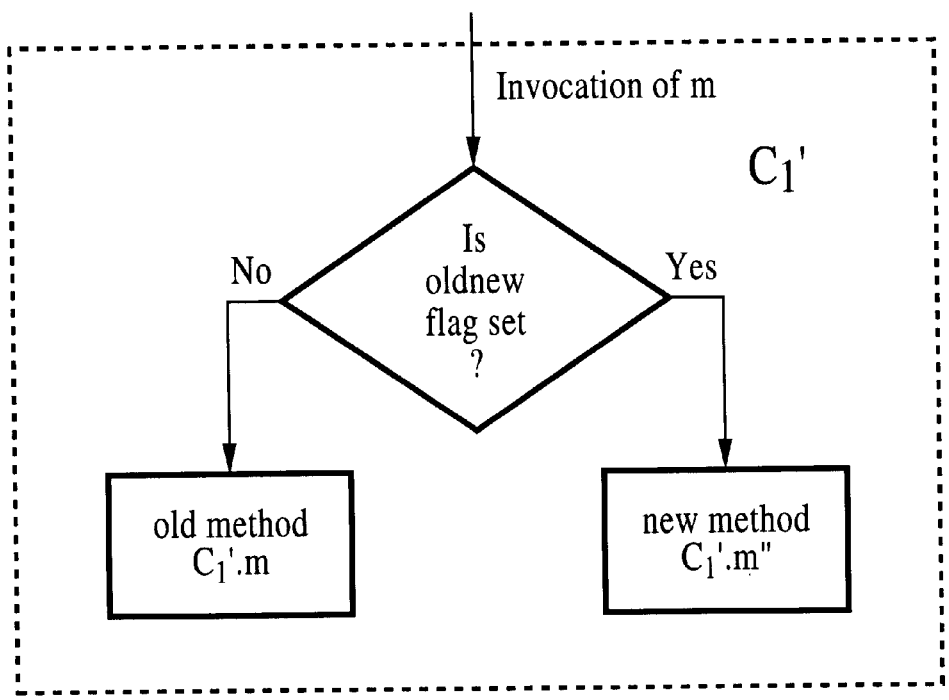
FIG. 11 is a flow chart of an algorithm used by an intermediate version of a class to choose the old version of a method or the new version of a method.
Figure 2A:
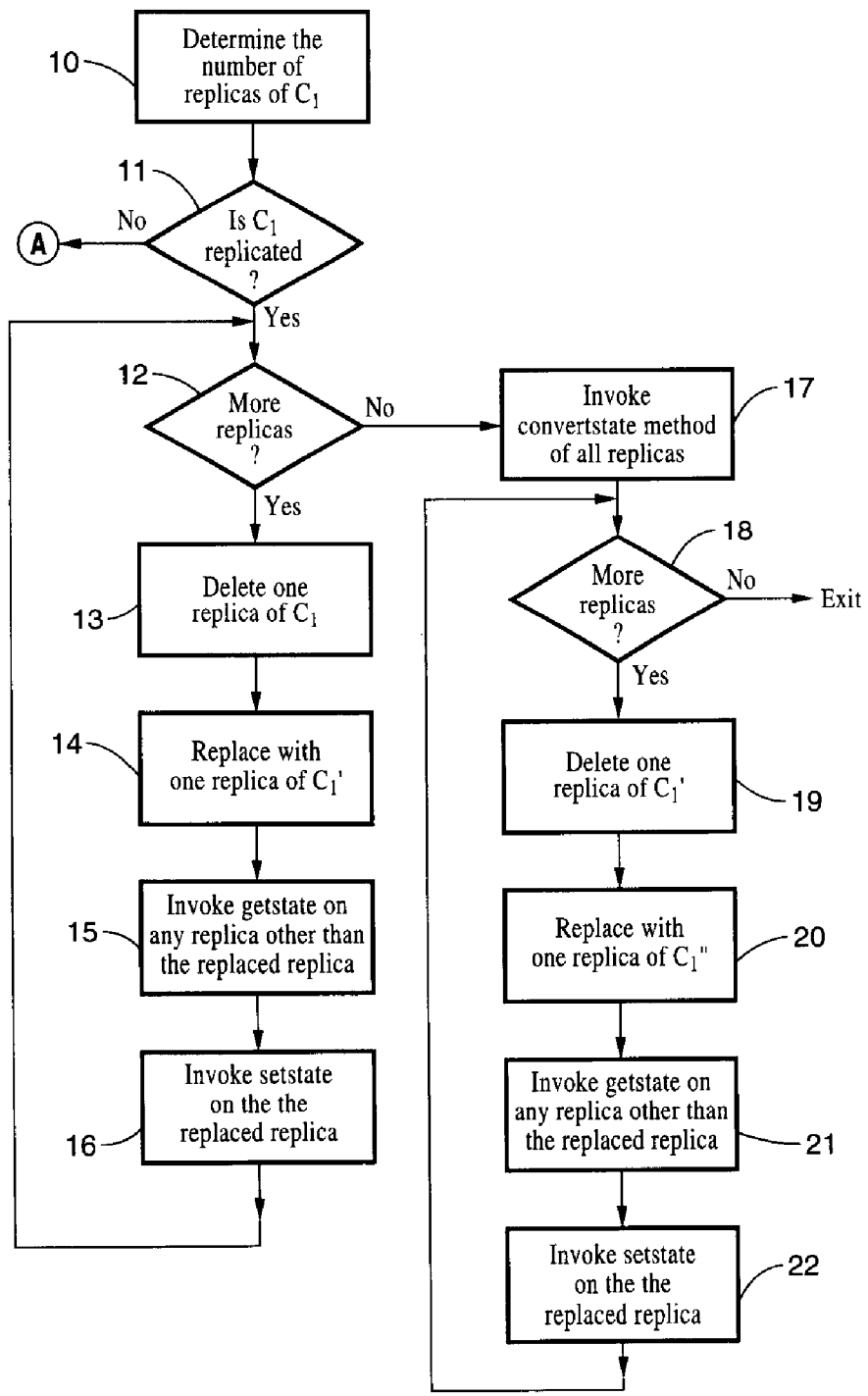

The processing required of the Preparer for a top class (step 138 in FIG. 8), as well as for the first intermediate version (step 118 in FIG. 8) and last intermediate version (step 119 in FIG. 8) of a class, is shown in FIG. 9. The processing for a top class is described first because it is simpler, although the Preparer may actually process non-top classes first. The main processing required for a top class is the construction of the intermediate class containing the methods and attributes of both the old and new classes. For each method (as determined at step 140), the Preparer generates code for a method of the intermediate class at step 141. When other objects invoke that method, the Preparer first checks the value of the old new flag and then invokes, within the intermediate version, either the method of the old version or the method of the new version, depending on the value of the old new flag, as shown in FIG. 11.

The Preparer also generates the convertstate method for the intermediate version of the class at step 142 that sets the old new flag to indicate that the new versions of the methods should be invoked. The Preparer also transfers values from the old versions to the new versions of the attributes.

If the attributes have not changed syntactically (step 145), and the programmer confirms that there are no semantic changes (step 146), the state conversion code is easy to generate (step 149) and is similar to the code for the getstate method of the old version and the setstate method of the new version.

If the new version of the class contains an attribute that was not present in the old version (step 148), the Preparer prompts the programmer for an initial value of that attribute or an expression that defines its initial value at step 150.

If the new version of the class contains an attribute that was present in the old version (step 147) but that is changed syntactically or is reported by the programmer to be changed semantically (step 146), the Preparer prompts the programmer for an expression that defines the new value of that attribute at step 150.

If some of the attributes of the old version are not present in the new version (step 148), the Preparer notifies the programmer at step 152 and, of course, does not generate code to assign values to those attributes.

In principle, the expressions that the computer programmer is required to supply for the convertstate method can be arbitrarily hard to devise. However, in practice, the changes from the old version of a class to a new version will be simple, and the convertstate method will be generated almost completely automatically by the Preparer.

For a non-top class, three intermediate versions of a class must be generated. The middle one is referred to as the primary intermediate version (step 139), and the other two are referred to as the first intermediate version (step 118) and the last intermediate version (step 119). All objects of the primary intermediate version must be capable of executing methods that were invoked by objects of both the old and the new versions of the classes, as shown in FIG. 7. To permit the upgrade from the old version to the primary intermediate version, and the upgrade from the primary intermediate version to the new version, two additional intermediate versions (the first intermediate version and the last intermediate version) are used to facilitate the atomic switchover shown in FIG. 3. As indicated above, the first intermediate version and the last intermediate version are generated by the algorithm described in Section 7 and shown in FIG. 9. The primary intermediate version (step 139 in FIG. 8) is generated by the algorithm with the assistance of the computer programmer, as described in Section 8 and shown in FIG. 10.

8. Section 8

Figure 10:
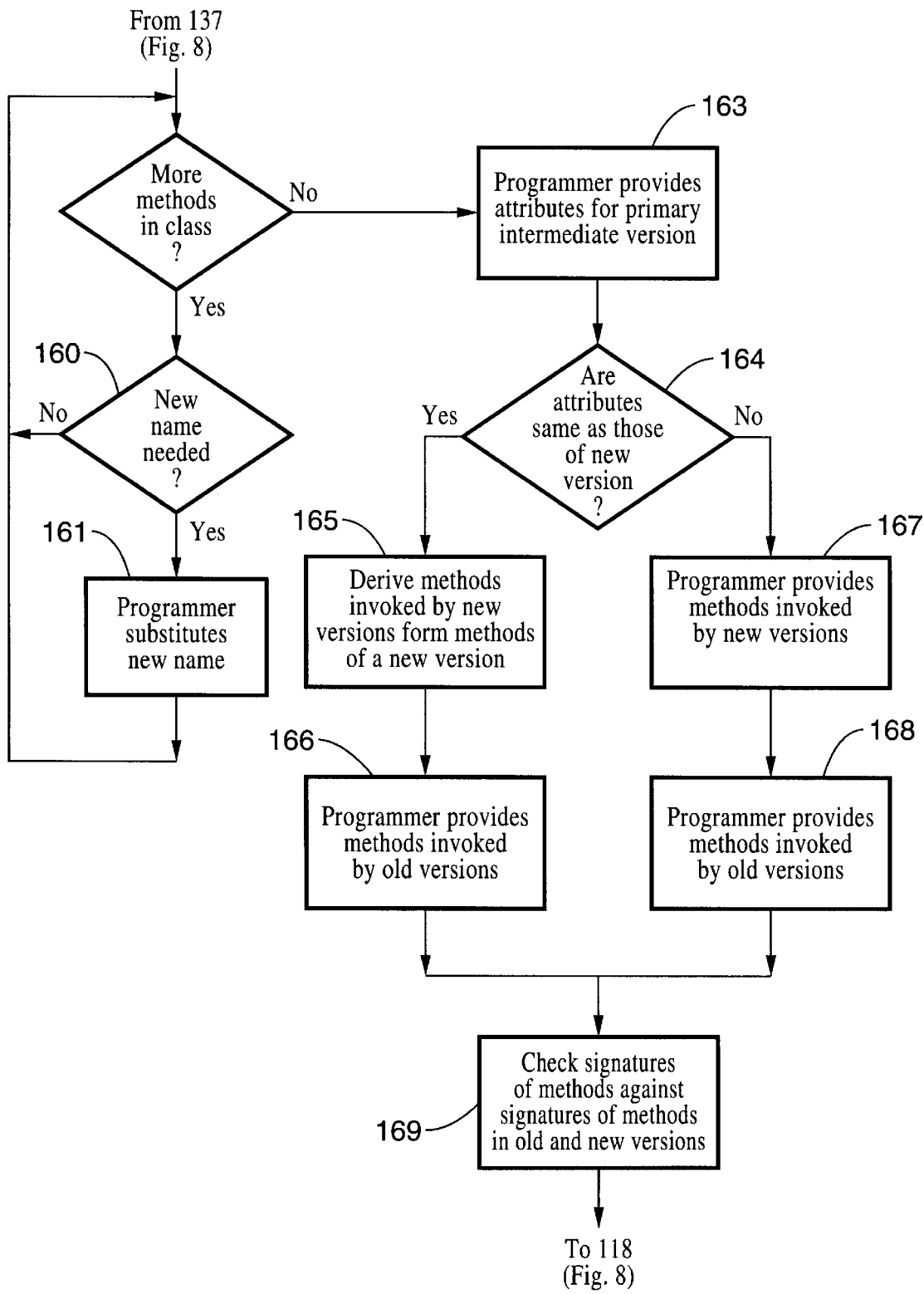
FIG. 10 is a flow chart of an algorithm used by the Preparer for generating the code of the primary intermediate version of a class.

Referring to FIG. 10, the primary intermediate version of a class may require that objects of an old version of a class invoke a method that is different from the method that objects of a new version of a class invoke. For such methods, a new name must be given to the method that the object of the new version should invoke (step 160). The Preparer prompts the programmer to substitute the new name into the program code at step 161.

The attributes of the primary intermediate version of a class, defined by the programmer at step 163, are derived from those of the old and new versions of the class. Typically, but not always, the attributes are those of the new version of the class (step 164). If so (step 165), the methods of the primary intermediate version, that are invoked by objects of new versions of other classes, can be derived directly from the methods of the new version of the class being upgraded. The modified methods, defined by the programmer, can be invoked by objects of the old versions of other classes (step 166). If the attributes of the primary intermediate version are not those of the new version of the class, the programmer must define both the methods to be invoked by objects of the new versions of other classes at step 167, and also the methods to be invoked by objects of the old versions of other classes at step 168. The Preparer checks the correspondence between the signatures of the methods of the primary intermediate version of the class prepared by the programmer and the signatures of the corresponding methods of the old and new versions of the class at step 169.

To assist the programmer in the preparation of these methods at steps 166, 167 and 168, the Preparer presents the methods of the old and new versions of the class to the programmer and prompts the programmer to provide the methods for the primary intermediate version. The programmer must provide the code for the convertstate method of the primary intermediate version that sets initial values for the attributes in the new version of the class but not in the old version of the class. The programmer must also provide the code that sets the values of those same attributes in the methods of the primary intermediate class that are invoked by objects of the old versions of other classes.

Having generated the primary intermediate version of the class (step 139 in FIG. 8), the Preparer then generates, with much less assistance from the programmer, two additional intermediate versions of the class (steps 118 and 119), which are necessary to perform the atomic switchover described in Section 2 and shown in FIG. 2A and FIG. 3. These two intermediate versions of the class are generated as described in Section 7 and shown in FIG. 9.

9. Section 9

As indicated above, the present invention is intended for implementation on a computer system which is critically operative in a continuous mode. It will be appreciated, however, that the invention could be implemented on a computer system that does not require such critical operation. Because computer systems are well known in the art, and the invention is applicable to a variety of such systems, the details of the computer systems are not described herein.

Accordingly, it will be seen that this invention provides for efficient and accurate live upgrading of object-oriented programs. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method for upgrading a set of objects of an object-oriented computer program, comprising:
   (a) applying a first sequence of modifications to said objects to provide said objects with a mechanism for upgrade, said first sequence of modifications having no effect on the behavior of said objects;
   (b) applying a sequence of atomic actions to said objects, said atomic actions effecting a change to the behavior of said objects; and
   (c) applying a second sequence of modifications to said objects to remove from said objects the mechanism for upgrading, said second sequence of modifications having no effect on the behavior of said objects;
   (d) wherein said objects are upgraded while said program is executing.

2. A method for upgrading a plurality of classes of objects of an object-oriented computer program, the method comprising the step of upgrading said classes wherein a coordinated upgrade set is determined such that the signatures of methods of objects of classes in the set that are invoked by objects of other classes in the set may be changed, but the signatures of methods of objects of classes in the set that are invoked by objects of classes not in the set remain unchanged.

3. A method as recited in claim 2, wherein an object of a class can be upgraded only when all objects of classes in the coordinated upgrade set, that are invoked by the object, have been upgraded to their primary intermediate versions.

4. A method as recited in claim 2, wherein an object of a class can be upgraded to its final version only when all objects of classes in the coordinated upgrade set, that invoke the object, have been upgraded to their final versions.

5. A method as recited in claim 2, wherein a class in a coordinated upgrade set can be upgraded only when all classes in the coordinated upgrade set, whose objects are invoked by objects of the class, have been upgraded to their primary intermediate versions.

6. A method as recited in claim 2, wherein a class in a coordinated upgrade set can be upgraded to its final version only when all classes in the coordinated upgrade set, whose objects invoke objects of the class, have been upgraded to their final versions.

7. A method for upgrading one or more objects of an object-oriented computer program, comprising:
   upgrading each said object while said program is executing;
   wherein there exist two or more replicas of each said object;
   each replica being capable of providing service required from said object, so that, while each replica is being upgraded, the other replicas of said object can provide uninterrupted service;
   wherein, as each said replica is being upgraded, state is transferred to said newly upgraded replica from another replica that continues to provide service while said replica is being upgraded, in order to bring the upgraded replica to a state that is consistent with the state of the other replicas that have continued to provide service during the upgrade; and
   wherein all replicas of said object agree, collectively as a consensus decision, on whether a method invocation or response should precede or follow the state transfer.

8. A method for upgrading one or more objects of an object-oriented computer program, comprising:
   upgrading each said object while said program is executing;
   wherein there exist two or more replicas of each said object;
   each replica being capable of providing service required from said object, so that, while each replica is being upgraded, the other replicas of said object can provide uninterrupted service; and
   wherein all replicas of said object that is being upgraded, whether each said replica has or has not been upgraded, receive the same set of messages, containing method invocation or response operations, in the same order.

9. A method as recited in claim 8, wherein an atomic broadcast protocol communicates messages to all replicas of an object that is to be upgraded, whether each said replica has or has not been upgraded, said messages containing method invocation or response operations.

10. A method for upgrading one or more objects of an object-oriented computer program, comprising:
   upgrading each said object while said program is executing;
   wherein there exist two or more replicas of each said object;
   each replica being capable of providing service required from said object, so that, while each replica is being upgraded, the other replicas of said object can provide uninterrupted service;
   wherein, as each said replica is being upgraded, state is transferred to said newly upgraded replica from another replica that continues to provide service while said replica is being upgraded, in order to bring the upgraded replica to a state that is consistent with the state of the other replicas that have continued to provide service during the upgrade; and
   wherein all replicas of said object that is being upgraded, whether each said replica has or has not been upgraded, receive the same set of messages, containing method invocation or response or state transfer operations, in the same order.

11. A method as recited in claim 10, wherein an atomic broadcast protocol communicates messages to all replicas of an object that is to be upgraded, whether each said replica h as or has not been upgraded, said messages containing method invocation or response or state transfer operations.

12. A method for upgrading one or more objects of an object-oriented computer program, comprising:

upgrading each said object while said program is executing;

wherein there exist two or more replicas of each said object;

each replica being capable of providing service required from said object, so that, while each replica is being upgraded, the other replicas of said object can provide uninterrupted service;

wherein, as each said replica is upgraded, state is being transferred to said newly upgraded replica from another replica that continues to provide service while said replica is being upgraded, in order to bring the upgraded replica to a state that is consistent with the state of the other replicas that have continued to provide service during the upgrade;

wherein all replicas of an object agree, collectively as a consensus decision, on whether a method invocation or response should precede or follow a state transfer; and wherein all replicas of said object that is being upgraded, whether each said replica has or has not been upgraded, receive the same set of messages, containing method invocation or response or state transfer operations, in the same order.

13. A method as recited in claim 12, wherein an atomic broadcast protocol communicates messages to all replicas of an object that is to be upgraded, whether each said replica has or has not been upgraded, said messages containing method invocation or response or state transfer operations.

14. A method for upgrading one or more objects of an object-oriented computer program, comprising:

upgrading each said object while said program is executing;

wherein there exist two or more replicas of each said object;

each replica being capable of providing service required from said object, so that, while each replica is being upgraded, the other replicas of said object can provide uninterrupted service; and wherein all replicas of an object agree, collectively as a consensus decision, on whether an invocation or response operation should precede or follow the atomic switchover that upgrades an object.

15. A method as recited in claim 14, wherein an atomic broadcast protocol communicates messages to all replicas of an object that is to be upgraded, whether each said replica has or has not been upgraded, said messages containing invocation or response operations, wherein the atomic broadcast protocol provides a collective consensus decision.

16. A method for upgrading one or more objects of an object-oriented computer program, comprising;

upgrading each said object while said program is executing;

wherein there exist two or more replicas of each said object;

each replica being capable of providing service required from said object, so that, while each replica is being upgraded, the other replicas of said object can provide uninterrupted service;

wherein, as each said replica is being upgraded, state is transferred to said newly upgraded replica from another replica that continues to provide service while said replica is being upgraded, in order to bring the upgraded replica to a state that is consistent with the state of the other replicas that have continued to provide service during the upgrade; and wherein all replicas of an object agree, collectively as a consensus decision, on whether an invocation, response or state transfer operation should precede or follow the atomic switchover that upgrades an object.

17. A method as recited in claim 16, wherein an atomic broadcast protocol communicates messages to all replicas of an object that is to be upgraded, whether each said replica has or has not been upgraded, said messages containing invocation, response or state transfer operations, wherein the atomic broadcast protocol provides a collective consensus decision.

* * * * *

UNITED STATES PATENT AND TRADEMARK OFFICE
CERTIFICATE OF CORRECTION

PATENT NO. : 6,360,363 B1
DATED : March 19, 2002
INVENTOR(S) : Louise E. Moser and Peter M. Melliar-Smith It is certified that error appears in the above-identified patent and that said Letters Patent is hereby corrected as shown below:

Drawings,
Figure 2A within step 10, change "Determine the number of replicas in $C_1$" to -- Determine the number of replicas of $C_1$ -- (as shown on the attached page)

Column 1,
Line 36, change "system" to -- program --

Column 4,
Line 50, delete "member"
Line 52, change "member" to -- those --

Column 6,
Line 65, change "$C_1$" to -- $C_1$ --

Column 7,
Line 8, "$C_1$"y" to -- $C_1$".y --

Column 8,
Line 26, change "C" to -- $C_1$' --

Column 10,
Line 3, change "C." to -- $C_1$. --
Line 52, change "$D_1$by" to -- $D_1$ by --
Line 57, change "123,124" to -- 123, 124 --

Column 13,
Line 28, change "Thus" to -- Thus, --

UNITED STATES PATENT AND TRADEMARK OFFICE
CERTIFICATE OF CORRECTION

PATENT NO. : 6,360,363 B1
DATED : March 19, 2002
INVENTOR(S) : Louise E. Moser and Peter M. Melliar-Smith It is certified that error appears in the above-identified patent and that said Letters Patent is hereby corrected as shown below:

Column 15,
Line 3, delete "h"
Line 4, change "as" to -- has --

Signed and Sealed this

Twenty-sixth Day of July, 2005

JON W. DUDAS
*Director of the United States Patent and Trademark Office*